(12) United States Patent
Eng et al.

(10) Patent No.: US 8,676,794 B2
(45) Date of Patent: *Mar. 18, 2014

(54) METHOD AND SYSTEM FOR ONLINE SEARCHING OF PHYSICAL OBJECTS

(75) Inventors: Kai Y. Eng, Atlantic Highlands, NJ (US); Pramod Pancha, Belle Mead, NJ (US)

(73) Assignee: Bellmar Communications LLC, Chicago, IL (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/023,600

(22) Filed: Feb. 9, 2011

(65) Prior Publication Data

US 2012/0203793 A1 Aug. 9, 2012

(51) Int. Cl.
*G06F 7/00* (2006.01)
*G06F 17/30* (2006.01)

(52) U.S. Cl.
USPC .......................................... 707/726; 707/722

(58) Field of Classification Search
None
See application file for complete search history.

(56) References Cited

U.S. PATENT DOCUMENTS

| | | | |
|---|---|---|---|
| 5,754,636 A * | 5/1998 | Bayless et al. | 379/142.1 |
| 5,918,223 A | 6/1999 | Blum et al. | |
| 7,277,766 B1 | 10/2007 | Khan et al. | |
| 2001/0038624 A1 * | 11/2001 | Greenberg et al. | 370/352 |
| 2002/0039095 A1 * | 4/2002 | Nakano | 345/204 |
| 2002/0120680 A1 | 8/2002 | Greco et al. | |
| 2006/0033809 A1 * | 2/2006 | Farley | 348/14.01 |
| 2007/0156726 A1 | 7/2007 | Levy | |
| 2008/0028223 A1 | 1/2008 | Rhoads | |
| 2008/0107051 A1 * | 5/2008 | Chen | 370/310 |
| 2009/0277322 A1 * | 11/2009 | Cai et al. | 84/609 |
| 2011/0242617 A1 * | 10/2011 | King et al. | 358/474 |

OTHER PUBLICATIONS

International Search Report and Written Opinion, dated May 8, 2012 of International Application No. PCT/US2012/22350, filed: Jan. 24, 2012.

* cited by examiner

*Primary Examiner* — Jau-Shya Meng
(74) *Attorney, Agent, or Firm* — Kaplan Breyer Schwarz & Ottesen, LLP

(57) ABSTRACT

Online searching related to a physical object by a user making use of a computing device is accomplished by creating a representation of the object at the user's computing device. A software button originating remote from the user's computing device is provided to the user's computing device, and the button is constructed based upon the representation of the object. The software button is associated with a second device in use by a subscriber associated with the object, the button and it is actuable by the user. Upon actuation of the software button by the user, an executable agent is downloaded to his computing device, effective to establish a connection between the user's computing device and the second device.

21 Claims, 3 Drawing Sheets

METHOD AND SYSTEM FOR ONLINE SEARCHING OF PHYSICAL OBJECTS

BACKGROUND OF THE INVENTION

The present invention relates generally to online searching and, more particularly, concerns a method and system for online searching of physical objects and multimedia, such as a broadcast radio or print media commercial, and establishing a communication relative to the multimedia through the use of an externally provided, actuable executable, such as a software button.

Online searches in accordance with the present invention are provided through the use of a "computing device", which will be understood to include not only an actual computer, such as a personal computer, but also any kind of intelligent device, such as a personal digital assistant (PDA) or a smart telephone, capable of Internet browsing. For voice communications, the device will need to be capable of sensing sound, as through a microphone, and producing sound, as through a speaker or earphone. Communication takes place through a network, such as the Internet and, in some instances, through the public service telephone network (PSTN).

Online searching, for example on the Internet, is by now a common experience. Even competent searchers spend endless hours seeking useful information on a wide range of subjects. A great deal of time could be saved if a searcher had immediate access to a human for assistance on the subject being searched.

In our co-pending U.S. patent application Ser. No. 12/603,683, filed Oct. 22, 2009, we disclose a method and system for facilitating telephone calls that convey the context of the call to the called party. The disclosure of that patent application is incorporated herein by reference in its entirety. In accordance with one embodiment of the invention disclosed in that patent application, a software button is utilized on a computing device to initiate a call. Activation of the button causes a "soft phone" to be downloaded from a server. The soft phone is essentially an executable software agent that operates on the computing device to set up a call to only a specified telephone number. The software agent causes certain call context information to be embedded which is unique to the actuated software button.

In our co-pending U.S. patent application Ser. No. 13/013,085, filed Jan. 25, 2011, a user performing a search on a computing device, for example with a browser application, is provided with one or more software buttons on the display of the device. The buttons are created based on the subject matter of his search. As the user searches, his queries are stored. Should the user actuate a software button, real time communication, for example a telephone call, is established with an adviser, who receives a copy of the user's search queries on his computing device.

We now seek to extend enhanced searching beyond Internet objects to physical ones. For example, suppose a user hears a broadcast radio advertisement while driving. Despite an advertiser's efforts to select an easy to remember telephone number or website name, the chances of a driver forgetting the contact information are very high. The efforts required for an occupied driver to remember a telephone number or website name and to later call the number or look up the website is a big barrier to the effectiveness of a broadcast advertisement campaign. To a great extent, advertisements in print media (newspapers, magazines, books on product labels) have similar difficulties. A commuter riding a train may read through newspaper and magazine advertisements without remembering the contact information for items of interest. Similarly, a shopper walking around in a supermarket or mall may see a product of interest and want to memorize it for further study or inquiry, and the only way to do so is to write down something from the product label.

In accordance with one aspect of embodiments of the present invention, a method is provided responding to a search by a user initiated by the user's submission through a computing device of a representation of a physical object. In response, an actuable software button associated with a device of a subscriber related to the object is returned. The software button is constructed so that, upon its actuation, a communication connection is established with the device of a subscriber related to the object and an identification of the object is sent to the device.

In accordance with another aspect of embodiments of the present invention, online searching related to a physical object by a user making use of a computing device is accomplished by creating a representation of the object at the user's computing device. A software button originating remote from the user's computing device is provided to the user's computing device, and the button is constructed based upon the representation of the object. The software button is associated with a second device in use by a subscriber associated with the object, the button and it is actuable by the user. Upon actuation of the software button by the user, an executable agent is downloaded to his computing device, effective to establish a connection between the user's computing device and the second device.

BRIEF DESCRIPTION OF THE DRAWINGS

The foregoing description and other objects, features, and advantages of the present invention will be understood more completely from the following detailed description of presciently preferred, but nonetheless illustrative, embodiments in accordance with the present invention, with reference being had to the accompanying drawings, in which.

DETAILED DESCRIPTION OF THE PREFERRED EMBODIMENTS

The terminology defined in this paragraph will be used consistently herein. A button is sent from a "Sender" to a "Recipient." When clicking on a button, the Recipient is attempting to initiate a communication, for example, a call to the Sender. Thus, when a call is established, the (button) Recipient is the "Caller" (making the call), and the (button) Sender is the "Receiver" (of the call). Recipient and Sender are associated with the button operation, and Caller and Receiver are associated with the call session.

Figure 1:
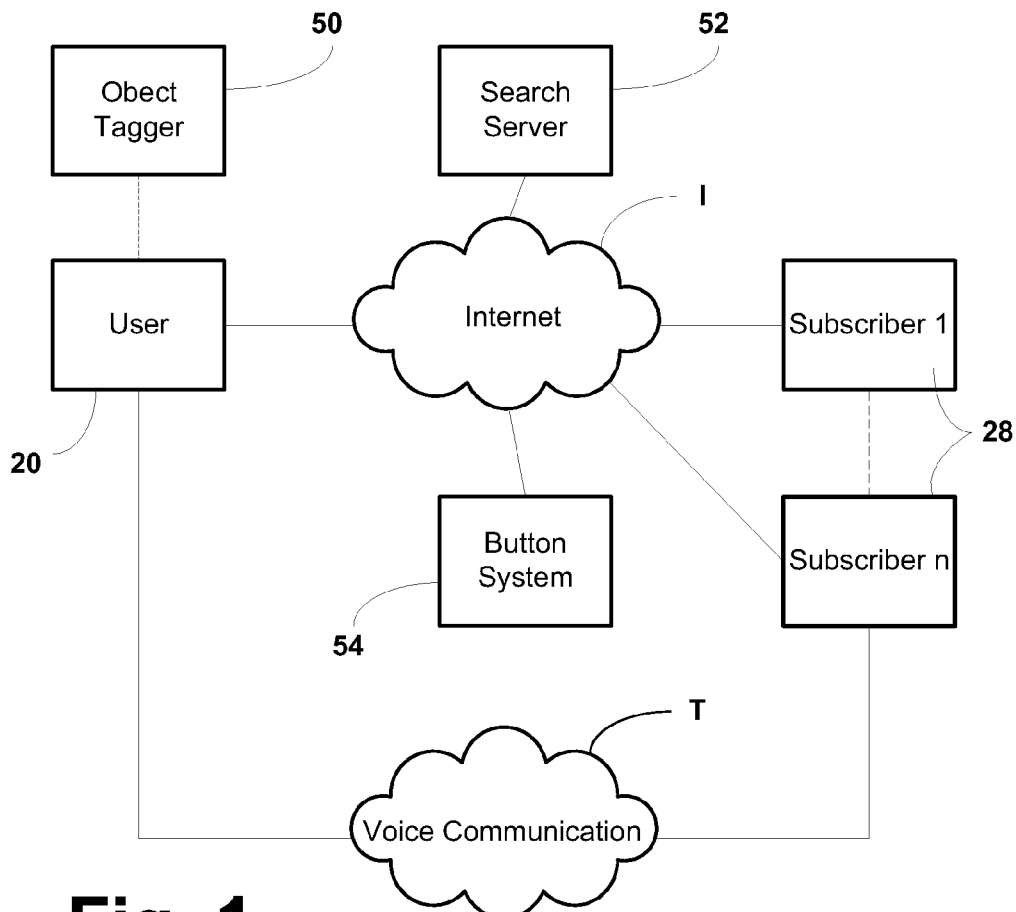
FIG. 1 is a functional block diagram illustrating the exemplary structure of a system in which the present invention is used.
Figure 2:
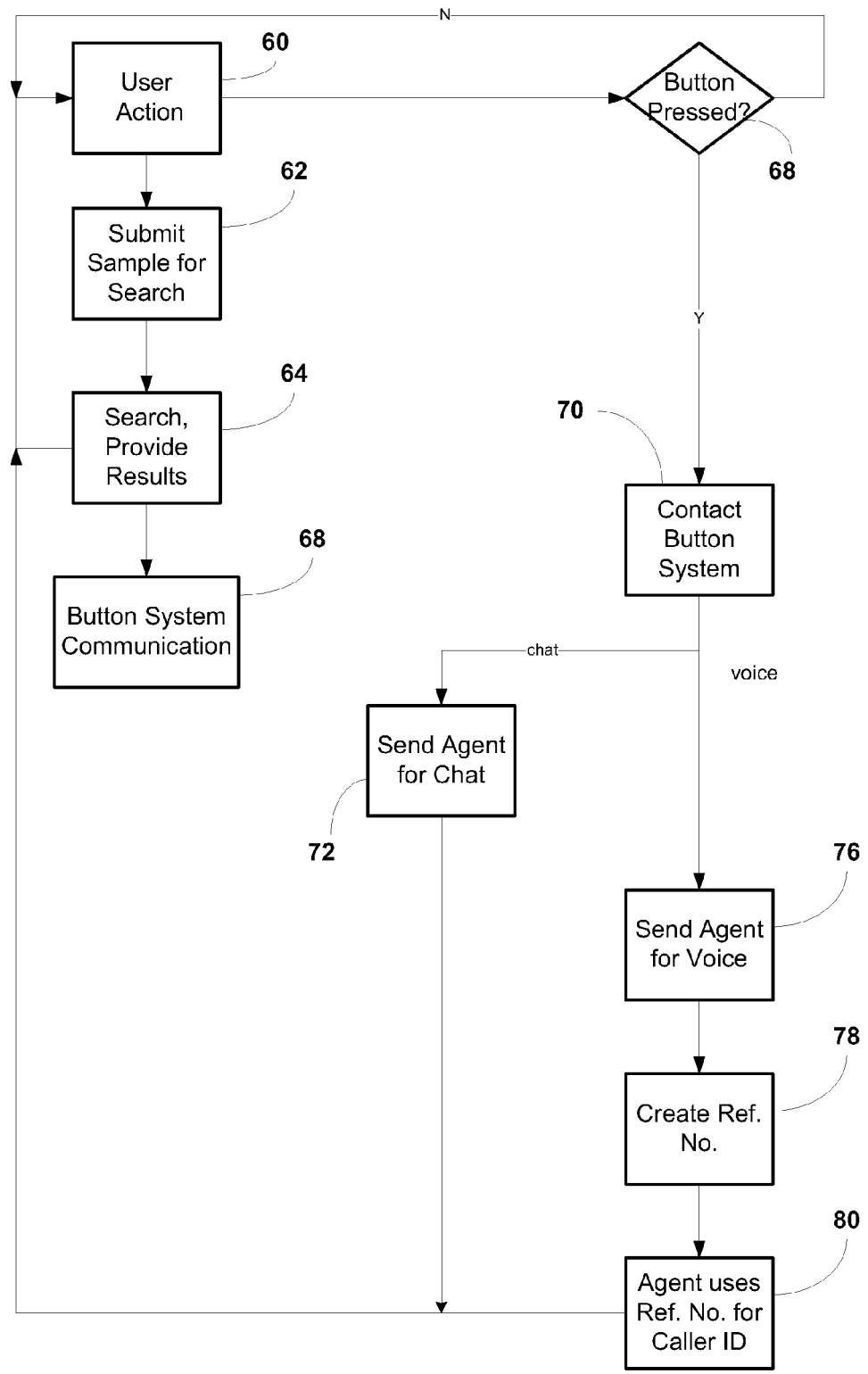
FIG. 2 is a flow chart illustrating steps which are performed in the system of FIG. 1, in performing a process in accordance with an embodiment of the present invention.

Turning now to the details of the drawings, FIG. 1 is a functional block diagram illustrating the exemplary structure of a system in which the present invention is used. FIG. 2 is a flow chart illustrating steps which are performed in the system of FIG. 1, in performing a process in accordance with an embodiment of the present invention. A user U is connected, through his computing device 20, to a network I, for example, the Internet. Also connected to the network I are n subscribers, through their computing devices 28, as well as a search server 52 providing a special search services and a search engine such as Google, and a button system 54. The user's and subscribers' computing devices 20, 28 are also connected to a telephone network T, which may be a public service telephone network (PSTN), a cellular network, a digital telephone network, such as a voice over Internet protocol (VoIP) network, or a combination of them.

In practice, user U will have to "tag" the object of his search with computing device 20 before undertaking the search. Tagging involves obtaining a representation of the object. For example, if the object is a radio advertisement and computing device 20 is a smartphone, it would contain an object tagger 50 (e.g. an application running on the smartphone) to capture a sound sample from the advertisement upon the user's operation of an activation key. This is not a typical start/stop recording, but an automatic capture of sound segment upon operation of a key. Similarly, if the object were viewable, the object tagger would be constructed to take a photograph of the object with the built-in camera on the smartphone, upon the user's operation of a key. Object tagger 50 stores captured samples for subsequent retrieval. Specifically, user U may review a sample and submit it as part of a search.

User U initiates an online search through his computing device 20 (block 60). At block 62, he retrieves a captured sample, using object tagger 50, and submits it as part of a search to search server 52. Server 52 then performs a search, using the submitted sample and returns the results to the user's computing device 20 (block 64).

In the present example, the sample is a tagged portion of a radio commercial. Server 52 has a database with a collection of "fingerprints" of radio commercials. The server runs a pattern recognition algorithm on the sample correlating the sample to the database. Appropriate pattern recognition algorithms exist in the art. See, for example, U.S. Pat. Nos. 7,277,766 and 5,918,223. Through this operation, server 52 will find one or more commercials that correlate to the sample. It then communicates with button system 54 to obtain communication buttons for the companies which provide the found commercials (block 68). These companies are all subscribers to the button system and would have set up appropriate buttons previously.

A search service is available at http://www.shazam.com which has a database of "fingerprints" of recordings of popular songs. A user runs an application on his smartphone which allows him to capture a sample recording of a song he hears. When he submits the sample recording to the server, it is correlated to the database, and the song is identified. Thus, the technology to perform the functions of search server 52 is readily available.

Search server 52 returns a web page to the containing the following features for each subscriber:
 an identification of the commercial;
 a software button to create a voice connection to a human representative of the subscriber;
 a software button to create a live chat between the user and a human representative of the subscriber.

A test is performed at block 68 to determine whether the user has activated a software button. If not, control returns to the user (block 60). When the test at block 68 determines that the user has activated a software button, communication is established with button system 54 (block 70). If the chat button was pressed, button system 54 sends a software agent to computing device 20 causing it to take part in a real time chat session running on computing device 28 of the respective subscriber (block 72). If the voice connection software button was pressed, button system 54 sends a software agent to computing device 20 which sets up a voice connection with corresponding subscriber via telephone network T (block 76). Button system 54 creates an internal reference number, for example, "1234" for this call and causes the voice call to the advisor to be set up with that reference number as the caller ID (block 78). It then sends a message to the user's computing device 28 containing the reference number and identifying the commercial identified by the user. In the present instance, the user's computing device might display the message:

From Caller ID#1234: XYZ advertisement.

Thus, the subscriber can see an identification of subject matter, as the call comes in to his telephone. Equipped with this context information, the subscriber is in a much better position to help the user.

It is contemplated that that communication between button system 54 and the subscriber's computing device 28 would be via a continuous real-time instant messaging session, which can be implemented completely independently of the telephone communication. To receive the telephone communication, the subscriber need only have a telephone with a caller ID display.

Making a communication connection with another party typically means making a telephone call (PSTN, cell or VoIP), sending an SMS (Short Message Service) message on a cell phone, sending an Instant Message (IM) on a computer or sending an email. In each of these examples, a Caller, who initiates the call or the connection (real-time or messaging) with his telephone or computing device, makes a clear choice of the connection or service type to be used (i.e., phone, email, IM or SMS). Depending on the service type selected, the resulting connection is made to the appropriate receiving device (phone, computer, email box, etc.) used by the Receiver, who is the intended recipient of the call.

Figure 3:
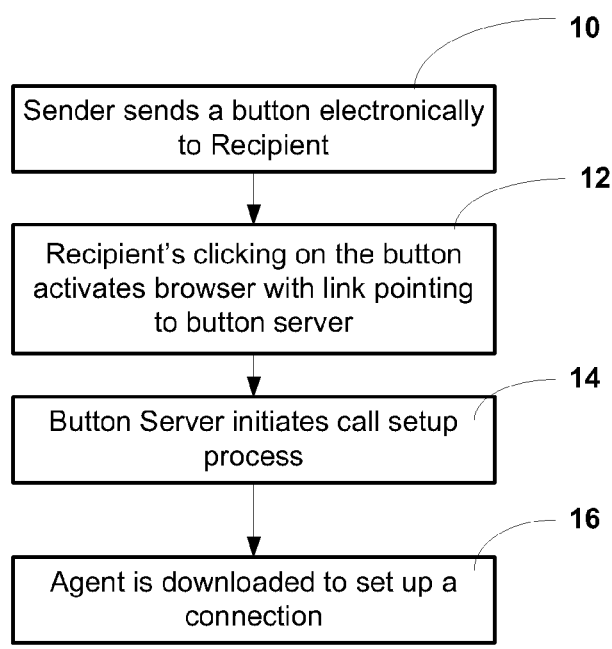
FIG. 3 is a flowchart illustrating the service usage steps between a Sender and a Recipient in a software button communication system.

FIG. 3 is a flowchart illustrating the service usage steps between a Sender (one of the subscribers) and a Recipient in a software button communication system. The process begins at block 10 when the Sender sends a software button to a Recipient's computing device (in our case via search server 52). When the Recipient actuates the received button by clicking on it (block 12), he can initiate a call or connection to the Sender. The process ends at block 14. No preinstalled software is required on the Recipient's computing device other than a standard Internet browser.

Figure 4:
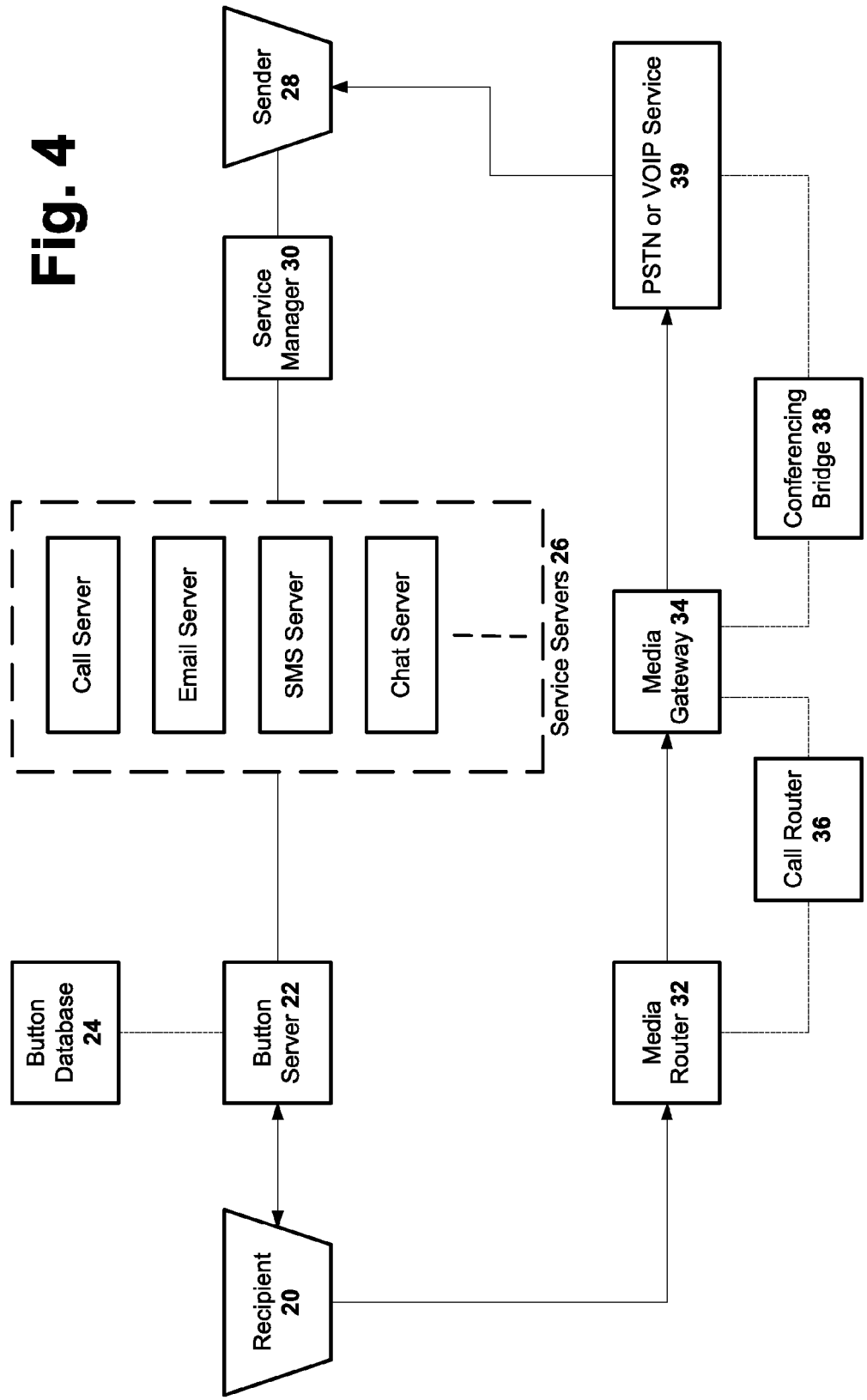
FIG. 4 is a functional block diagram of a preferred button service system.

FIG. 4 is a functional block diagram of a preferred button service system 54. A button received by a Recipient's computing device 20 is essentially a website link to a Button Server 22. In addition to the Button Server address, the button is also encoded with unique button identification (BID). When the button is clicked, the Recipient's web browser opens a link directed to the Button Server as equivalent to a call request. When the BID is received by Button Server 22, a lookup is done immediately in a button database 24 accessible to Button Server 22, using the BID, to retrieve the state of the Button.

The service servers 26 shown in FIG. 2 are used to provide various services or connections. The Sender's computing device 28 has access to servers 26 through a Service Manager 30, in order to set up various services. For example, the Sender needs to provide telephone numbers and e-mail addresses to service servers 26. For real time services, e.g., voice or video, media packets are transmitted from the Recipient's computing device 20 to a Media Router 32 and media gateway 34 for handling instead of going through the Button Server. Also included are a Call Router 36 and a Conference Bridge 38 for handling these routine communication functions. It should be noted that there are also non-connection oriented services possible in this system, e.g. Sender Location or Presence. The Service Servers 26 may also include a Conferencing Server.

In configuring a particular communication option, a Sender obviously has to provide appropriate parameters to use. For example, the Sender has to specify a phone number for calling, an email address for email, and so on. These parameters are written into button database 24, available to server 22, and they are hidden from the users. The parameters provided by a subscriber can be changed anytime.

Although preferred embodiments of the invention have been disclosed for illustrative purposes, those skilled in the art will appreciate that many additions, modifications, and substitutions are possible without departing from the scope and spirit of the invention as defined by the accompanying claims.

What is claimed:

1. A method for online searching related to an object by a user with a computing device, comprising the steps of:
    at the user's computing device, creating a representation of an object, wherein the object includes an audio presentation and the representation includes a sound sample from the audio presentation;
    sending the representation to a server computer at a remote searching location;
    the server computer correlating the sent representation to a database of representations using the sent representation as an input to identify a result in the database corresponding to the sent representation;
    returning the identified result to the user's computing device;
    providing to the user's computing device a software button originating remote from the user's computing device which is constructed based upon the identified result, the software button being associated with a second device in use by a subscriber associated with the object, the software button being actuable by the user; and
    upon actuation of the software button by the user, downloading an executable agent to the user's computing device, effective to establish a connection between the user's computing device and the subscriber associated with the object, the connection including voice communication.

2. The method of claim 1, wherein the creating step is performed automatically by the user's computing device upon an actuation by the user.

3. The method of claim 1 wherein the representation is a data representation of the object.

4. The method of claim 3 wherein the object further includes one of a visual presentation and an actual tangible object and the representation includes an image of at least a portion thereof.

5. The method of claim 1 wherein the second device includes a telephone with caller ID recognition, the method further comprising generating a reference number associated with the representation of the object and, after the user actuates the software button, sending the reference number to the second device as a caller ID.

6. The method of claim 5 wherein the downloading step includes receiving at the user's computing device an identification of the physical object, said method further comprising transmitting the identification of the physical object together with the reference number to the second device after the user actuates the software button.

7. The method of claim 6 further comprising: at the second device, displaying the identification of the physical object in association with the reference number.

8. A system for online searching related to an object by a user with a computing device, comprising:
    at the user's computing device, a generator of a representation of the object wherein the object includes an audio presentation and the representation includes a sound sample from the audio presentation;
    a transmission device at the user's computing device for sending the representation to a remote searching location;
    a searching server computer at the remote searching location receiving the representation, the server having access to a database of representations and correlating the received representation to the database to identify a result in the database corresponding to the representation of the object, and a subscriber associated therewith, the subscriber using a second device;
    a generator of an executable agent constituted to establish a communication connection between the user's computing device and the second device based upon the identification of the object corresponding to the identified result and the identification of the subscriber associated with the object, the established connection including voice communication;
    a software button which is: associated with the second device, available to the user's computing device, actuable by the user of the second device, and which is constructed so that, upon actuation by the user, the software button causes the executable agent to be downloaded from the generator of an executable agent to the user's computing device.

9. The system of claim 8, further comprising a processor utilizing the subscriber identification to create the software button.

10. The system of claim 8 wherein the generator of a representation of the object is constructed to operate automatically upon a single actuation by the user.

11. The system of claim 8 wherein the representation is a data representation of the object.

12. The system of claim 11 wherein the object further includes one of a visual presentation and an actual tangible object and the representation includes an image of at least a portion thereof.

13. The system of claim 8 wherein the second device includes a computerized device and a separate telephone with caller ID recognition.

14. The system of claim 8 wherein the second device includes a telephone with caller ID recognition, wherein the system generates a reference number associated with the representation of the object and, the system comprising means in the downloaded software agent for sending the reference number to the second device as a caller ID.

15. The system of claim 14 wherein the software button also includes an identification of the physical object, the executable agent being constructed to cause the identification of the physical object to be transmitted to the second device together with the reference number.

16. The system of claim 15 further comprising a display control at the second device constructed to display the identification of the physical object in association with the reference number.

17. A method for online searching related to an object of interest to a user having a computing device, comprising the steps of:
    at the user's computing device, obtaining a sample of the object of interest, wherein the object is an audio presentation and the representation is a sound sample of the audio presentation;

the user's computing device submitting the sample representation of the object to a search server;

the user's computing device receiving a search result from the search server, the search result being generated based on a correlation of the sample representation to entries in the database, and the search result corresponding to the sample representation of the object, the search result including a software button being constructed based on upon the sample representation of the object, the software button being associated with a subscriber having a computing device, the button being actuable by the user; and upon said button being actuated by the user, downloading an executable agent to the user's computing device, the executable agent being effective to establish a communication connection between the user's computing device and the subscriber computing device, the communication connection including voice communication, wherein parameters for establishing the communication connection between the user's computing device and the subscriber computing device are hidden from the user.

18. The method of claim 17 wherein the object is a radio advertisement and the sample representation of the object is a segment of the radio advertisement.

19. The method of claim 17 wherein the object is a popular song, and the sample representation of the object is a segment of the song.

20. The method of claim 17 wherein the step of receiving a search result comprises:

receiving an identification of the object for which said sample was submitted in the submitting step.

21. The method of claim 18 wherein the step of receiving further comprises:

receiving a software button operable to establish a communication connection with a company associated with the radio advertisement.

* * * * *